United States Patent Office 3,153,650
Patented Oct. 20, 1964

3,153,650
PROCESS FOR PREPARING ACYLATED ENAMINES
Francis Johnson, Newton Lower Falls, Mass., assignor to The Dow Chemical Company, Midland, Mich., a corporation of Delaware
No Drawing. Filed Nov. 1, 1961, Ser. No. 149,230
10 Claims. (Cl. 260—247.2)

The present invention is directed to a process for preparing acylated enamines and more particularly for preparing adducts of glutarimide β-acetylhalides and an enamine.

It is an object of this invention to prepare novel adducts of glutarimide β-acetylhalides and an enamine and to provide a process for preparing said novel adducts.

I discovered that an enamine can be reacted with a glutarimide β-acetylhalide, in a non-protonic solvent, to form an adduct (or reaction product) of the enamine with the glutarimide. The reaction is represented by the following:

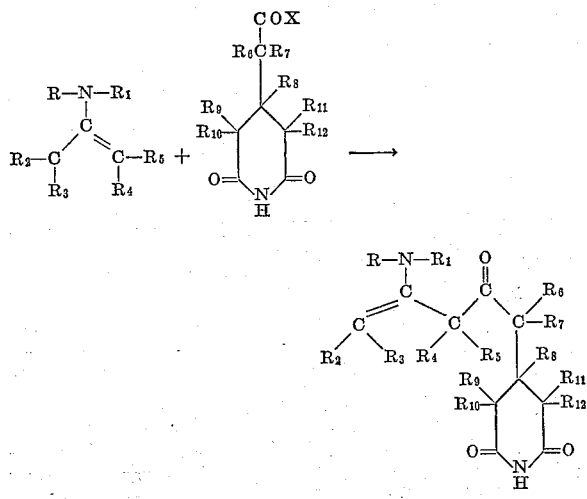

X is a halogen, preferably chlorine or bromine. The R groups may be hydrogen or any substituting group or radical such as lower alkyl, aryl, alkoxyl, aryloxyl, dialkylamino, halogen, etc. These are exemplified by methyl, butyl, benzyl, octyl, phenyl, diethylamino, phenoxyl, methoxyl, etc. The R groups of the glutarimide reactant, $R_6$–$R_{12}$, are preferably hydrogen or lower alkyl. It is also preferred that not more than one hydrogen should be substituted for on a ring carbon. The R groups of the enamine may be cyclized or fused to form cyclic compounds, e.g., an enamine of a cyclic ketone. These cyclic compounds may, and usually do, contain substituting groups on the ring carbon atoms. The preferred enamine reactants have the formula

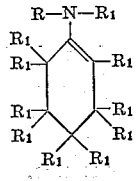

The preferred R' groups are hydrogen, lower alkyl and halogen. It is also preferred that the ring carbon atoms should be bonded to at least one hydrogen atom. The useful R groups (R, $R_1$–$R_9$, and R') are those that do not react with the reactants and reaction products under the process conditions.

The reaction and product is illustrated by the reaction of glutarimide β-acetylchloride with the morpholine enamine of 2,4-dimethylcyclohexanone to prepare the enamine of dehydrocycloheximide, as follows:

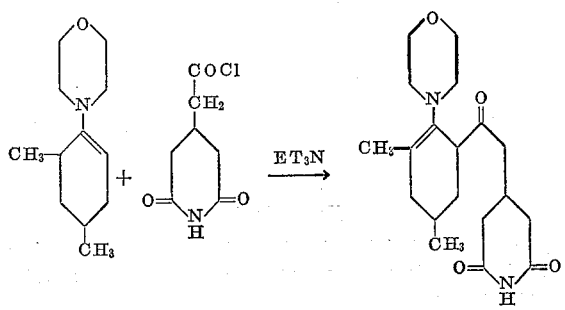

The glutarimide β-acetylchloride reactant is prepared from 3-carboxymethylglutarimides by gently refluxing the 3-carboxymethylglutarimide with thionyl chloride. 3-carboxymethylglutarimide may be prepared as disclosed in my copending application filed of even date herewith entitled "Process for the Preparation of Glutarimide Compounds," Serial No. 149,172, which is by this reference incorporated herein. Equivalents of the glutarimide β-acetylchloride, such as the glutarimide β-acetyl cyanide or thiocyanate, or the equivalent mixed anhydride of glutarimide β-acetic acid with a monoester of carbonic acid, such as ethyl hydrogen carbonate, may be used in place of the glutarimide β-acetyl chloride in this reaction. The other halides are the equivalent of the chloride illustrated herein.

The enamine reactant has the general formula specified hereinbefore. It is preferably the enamine of a cyclic ketone, such as, cyclohexanone and substituted cyclohexanones, or the enamine of a secondary amine and an aliphatic ketone, e.g., the enamines of acetophenone or methyl t-butyl ketone. These enamines are prepared from the ketone and such nitrogen containing compounds as the cyclic and simple secondary amines which include piperidine, pyrrolidine, morpholine, and diethylamine, bis(2-methoxyethyl)amine.

The reaction takes place in a non-protonic solvent such as chloroform, dioxane, tetrahydrofuran, methylene chloride, benzene, acetone, etc. The solvent should contain a base to act as a scavenger for the acid (generally HCl) produced during the reaction. Such bases as dimethylaniline, pyridine, and triethylamine are useful. The tertiary amines are preferred. The reaction temperature is not critical and may be between about —80° C. and +100° C. It is preferable that the temperature be between 0° C. and 40° C. to obtain optimum yields. The reaction will take place at atmospheric pressure. Although stoichiometric proportions of the reactants can be used, it is preferred that an excess of the enamine be employed. Between 1 and 4 times as much enamine is preferred.

For purposes of further explaining the invention, to those skilled in the art, the following illustrative examples are given:

Example 1

3-carboxymethylglutarimide (5.16 g.) was converted into the acid chloride in the usual way. This material without further purification was suspended in dry chloroform (75 ml.) and treated with a solution of triethylamine (6.07 g.) in chloroform (25 ml.) over a period of 20 minutes with stirring at ice bath temperatures. After stirring for a further 10 minutes the morpholine enamine of cyclohexanone (10.03 g.) was added dropwise during 20 minutes. Stirring was continued for 5 hrs. at room temperature and at this point the mixture was homogeneous but brown in color. The mixture contained the acylated enamine,

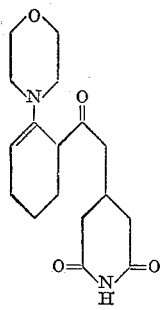

Example 2

3-carboxymethylglutarimide (1.7 g.) was converted into the acid chloride using a known procedure. The resulting crude material was suspended in dry chloroform (50 ml.) and treated with a solution of triethylamine (2.0 g.) in dry chloroform (25 ml.) over a period of 20 minutes while stirring at ice bath temperatures. The morpholine enamine of 2,4-dimethylcyclohexanone (3.5 g.) was then added during half an hour while stirring at room temperature. Stirring was continued overnight during which time the mixture became brown in color and almost homogeneous, only a very small amount of solid remaining in suspension. The solution contained the acylated enamine,

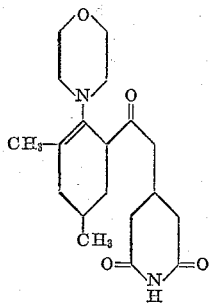

Example 3

3-carboxymethylglutarimide (5.0 g.) was gently refluxed with thionyl chloride (50 ml.) until complete solution of the solid had been affected. The excess thionyl chloride was removed under reduced pressure on the steam bath and the crystalline acid chloride remaining was freed of traces of thionyl chloride by drying under vacuum for 2 hours over anhydrous potassium carbonate. The acid chloride was then slurried in dry chloroform (100 ml.) under a nitrogen atmosphere. The temperature of the mixture was adjusted to 0° C. by means of an ice bath and a solution of dry triethylamine (5.0 g.) in dry chloroform (25 ml.) added in 1 portion. The mixture was stirred for 15 minutes and then a solution of the morpholine enamine of cis-2,4-dimethylcyclohexanone (17.1 g.) in dry chloroform (25 ml.) was added in 1 portion. Stirring under nitrogen was continued for 16 hours, the mixture slowly coming to room temperature during the early part of this stirring period. At the end of this time a small amount of solid material remained undissolved. This was collected by filtration (118.0 g.) and discarded. The filtrate contained the acylated enamine,

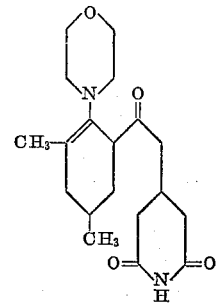

Example 4

3-carboxymethylglutarimide (3.44 g.) was finely powdered and added to thionyl chloride (35 ml.). The mixture was gently refluxed until homogeneous. Excess thionyl chloride was removed under reduced pressure and the crystalline pale-brown solid residue was stored over potassium hydroxide pellets for 3 hrs. in a vacuum desiccator. To the dry acid chloride there was added a solution of dry triethylamine (3.03 g.) in pure dry chloroform (50 ml.). The mixture was stirred for 5 minutes magnetically and there was then added in one portion of the morpholine enamine of cyclohexanone (10.5 g.). After stirring for 1½ hours the mixture had become a completely homogeneous clear solution. Stirring was then continued overnight. The chloroform was removed under reduced pressure yielding as a brown residue, the acylated enamine product of Example 1. The same product was obtained using the mixed anhydride of 3-carboxymethylglutarimide and ethyl hydrogen carbonate in place of the acid chloride of 3-carboxymethylglutarimide.

Example 5

3-carboxymethylglutarimide (5.13 g.) was gently refluxed with thionyl chloride (60 ml.) unit until the solution became homogeneous. Excess thionyl chloride was then removed under reduced pressure and the highly crystalline pale-brown residue was stored over potassium hydroxide in a vacuum desiccator for 2 hours to remove remaining traces of thionyl chloride. The solid was then suspended in dry chloroform (75 ml.) and with stirring under nitrogen. Triethylamine (4.5 g.) was added. After stirring for 5 minutes the morpholine enamine of 2-methylcyclohexanone (10.86 g.) was added over a period of 3 minutes. Stirring was then continued for 16 hours. The liquid was then filtered to remove a trace of insoluble material (0.3 g.) and the filtrate evaporated under reduced pressure at less than 40° to remove chloroform, and to yield the acylated enamine,

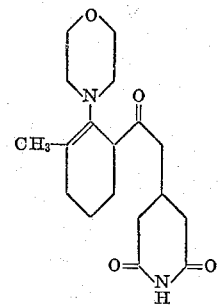

Example 6

Following the procedure of Example 2, the morpholine enamine of 2,4-dibutylcyclohexanone is used in place of the enamine of 2,4-dimethylcyclohexanone to obtain the corresponding acylated enamine.

Example 7

Following the procedure of Example 3, the morpholine enamine of 4-ethoxycyclohexanone is used in place of the enamine of cyclohexanone to obtain the corresponding acylated enamine.

Example 8

Following the procedure of Example 3, the morpholine enamine of 2-butylcyclohexanone is used in place of the enamine of cyclohexanone to obtain the corresponding acylated enamine.

Example 9

Following the procedure of Example 3, the morpholine enamine of 2-ethylcyclohexanone is used in place of the enamine of cyclohexanone to obtain the corresponding acylated enamine.

Example 10

Following the procedure of Example 3, the morpholine enamine of 2,4-diethylcyclohexanone is used in place of the enamine of cyclohexanone to obtain the corresponding acylated enamine.

Experiments similar to those described herein were carried out utilizing the piperidine and pyrrolidine enamines of cyclohexanone, in place of the morpholine enamine of cyclohexanone to obtain the corresponding acylated enamines. Similarly, other acylated enamines are prepared from starting materials having R substituents that do not affect the condensation reaction.

The compound prepared in accordance with this invention have biological activity. They are immediately useful as intermediates in the preparation of dehydrocycloheximide and various isomers and homologues thereof. They are also useful intermediates in the preparation of unsaturated ester derivatives of 1-oxo-2-(3-glutarimidyl) ethane. These classes of compounds are useful as fungicidal agents and rodent repellents. The preparation of dehydrocycloheximide compounds from these acylated enamines is disclosed in copending application entitled "Cyclic Compounds," Serial No. 149,174, filed of even date herewith by applicant jointly with Alexander C. Paton. The preparation of the unsaturated ester derivatives of 1 - oxo - 2 - (3 - glutarimidyl)ethane from the acylated enamines is disclosed in applicant's application filed of even date entitled "Cyclic Compound" Serial No. 149,162.

Although the invention has been illustrated by specific examples, it is to be understood that it includes all modifications and variations that some within the scope of the appended claims.

What is claimed is:

1. The process comprising reacting, in a non-protonic solvent containing an organic base, a glutarimide β-acetyl halide having the formula

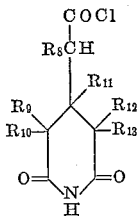

with a cyclic enamine having the formula

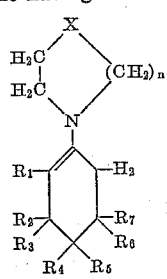

wherein the R groups are selected from the group consisting of hydrogen, lower alkyl, and lower alkoxy, X is selected from the group consisting of oxygen and methylene, and $n$ is a digit from 1 to 2.

2. The process comprising reacting, in a non-protonic solvent at a temperature between 0° C. and 40° C. and containing a tertiary amine base, a glutarimide β-acetyl halide having the formula

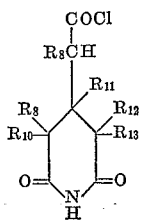

with a cyclic enamine having the formula

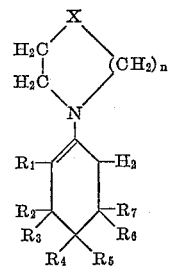

wherein the R groups are selected from the group consisting of hydrogen, lower alkyl, and lower alkoxy, X is selected from the group consisting of oxygen and methylene, and $n$ is a digit from 1 to 2.

3. An acylated enamine of the formula

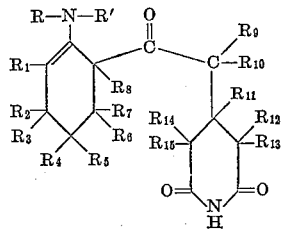

wherein R, R' and the numbered R substituents are selected from the class consisting of hydrogen and lower alkyl.

4. An acylated enamine of the formula

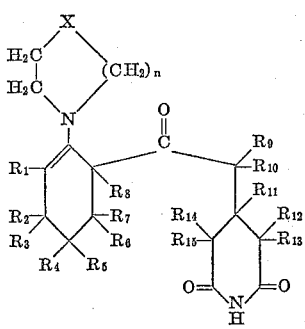

wherein the substituents $R_1$–$R_{15}$ are selected from the class consisting of hydrogen, lower alkyl and lower alkoxy, $n$ is a digit from 1 to 2, and X is selected from the group consisting of oxygen and methylene.

5. An acylated enamine of the formula
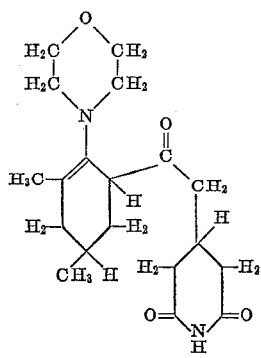
6. An acylated enamine of the formula
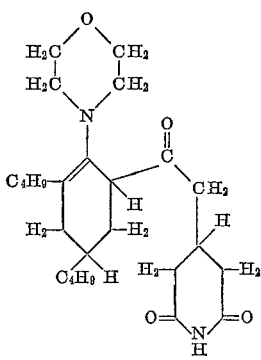
7. An acylated enamine of the formula
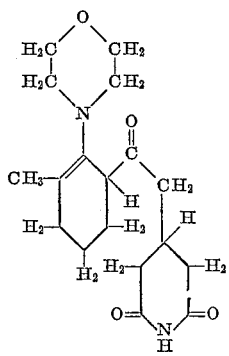
8. An acylated enamine of the formula
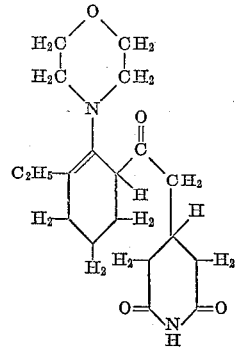
9. An acylated enamine of the formula
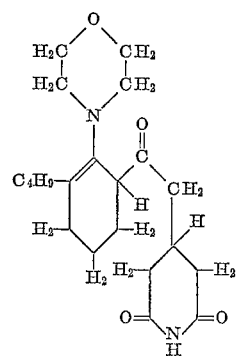
10. An acylated enamine of the formula
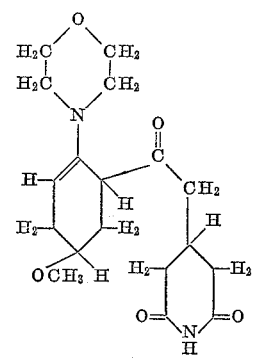
References Cited in the file of this patent
Noller: Chemistry of Organic Compounds, second edition, pp. 161–2 and 475 (1957), QD 253 N 65.